United States Patent [19]

Stark et al.

[11] Patent Number: 4,909,361

[45] Date of Patent: Mar. 20, 1990

[54] DRIVE SHAFT DAMPER

[75] Inventors: Martin H. Stark; Gary A. Conger, both of Saginaw, Mich.

[73] Assignee: Arrow Paper Products Company, Saginaw, Mich.

[21] Appl. No.: 257,070

[22] Filed: Oct. 13, 1988

[51] Int. Cl.4 .................................................. F16C 1/00
[52] U.S. Cl. .................................... 188/268; 180/381; 464/180
[58] Field of Search .............. 188/268, 322.16, 322.17, 188/322.18; 180/75.2, 73.1; 464/179, 180; 262/90

[56] References Cited

U.S. PATENT DOCUMENTS

| 3,274,798 | 9/1966 | Wiggins, Jr. | 464/180 |
| 3,769,813 | 11/1973 | Okada | 464/180 |
| 4,014,184 | 3/1977 | Stark | 464/180 |
| 4,445,598 | 5/1984 | Brambilla | 188/322.16 |
| 4,693,343 | 9/1987 | Boyd | 267/64.11 |

Primary Examiner—Andres Kashnikow
Assistant Examiner—Matthew L. Graham
Attorney, Agent, or Firm—Learman & McCulloch

[57] ABSTRACT

A vibration damper for the hollow drive shaft of an automotive vehicle has a liner press fitted into the bore of the drive shaft and a resilient, deformable, elastic, highly frictional retaining strip which forcibly bears against the surface of the bore and fixes the liner in place within the shaft.

20 Claims, 1 Drawing Sheet

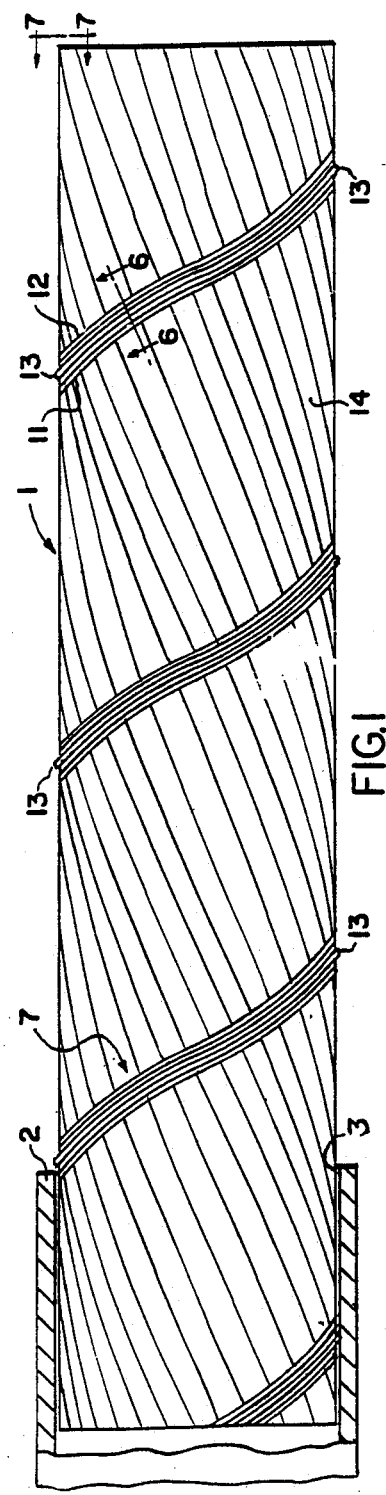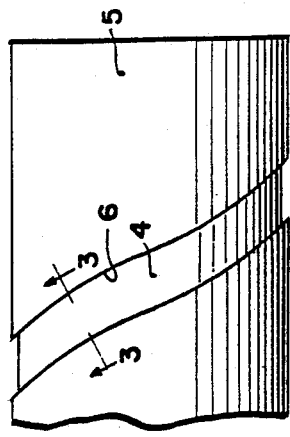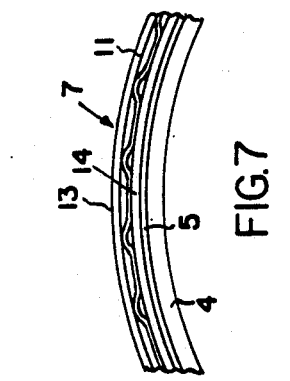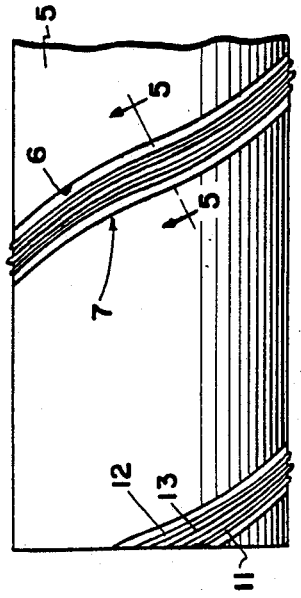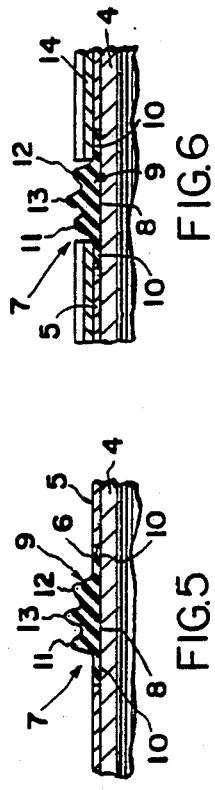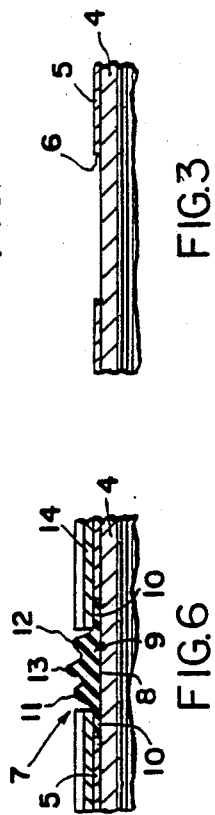

DRIVE SHAFT DAMPER

This invention relates to a tubular liner adapted to be inserted in a hollow, automotive drive shaft to damp vibrations.

BACKGROUND OF THE INVENTION

An automotive vehicle conventionally utilizes a hollow, tubular drive or propeller shaft for transmitting driving torque from the engine or transmission to the driving wheels. It is not uncommon for such shaft to be subjected to vibrations from one or more sources. It is desirable to damp such vibrations so as to provide for a quieter ride.

Various kinds of vibration dampers have been proposed heretofore. Typical of such dampers are the liners disclosed in U.S. Pat. Nos. 2,751,765; 3,075,406; and 4,014,184. Although such dampers have performed reasonably well in absorbing propeller shaft vibrations, it has been found that they have a tendency to creep relative to the propeller shaft due to the repetitive application and release of driving torque thereon. It also has been found that in some instances changes in temperature and humidity cause variations in the ability of a liner to resist movements relative to the propeller shaft. In addition, liner insertion procedures and conditions sometimes differ with the result that a liner may be damaged in its insertion within the shaft, thereby adversely affecting its ability to perform its damping function.

An object of the present invention is to provide a damper which overcomes the above identified problems.

SUMMARY OF THE INVENTION

A damper constructed in accordance with the preferred embodiment of the invention comprises a liner for insertion in the bore of a hollow drive shaft, the liner having a base tube or core formed of helically wound paper on which is secured a helical retaining strip having high frictional properties. The outside diameter of the core is less than the diameter of the bore of the propeller shaft so as to facilitate insertion of the core into the shaft, but the retaining strip projects beyond the outer surface of the core a distance sufficient to ensure engagement of the retaining strip with the surface of the bore. Preferably, that portion of the retaining strip which engages the bore of the propeller shaft is sufficiently deformable as to avoid material difficulties in inserting the damper into the propeller shaft, but is of sufficient resilience to ensure retention of the liner in a selected position within the shaft.

The damper preferably includes, between adjacent convolutions of the retaining strip, an outer layer of corrugated paper which may have some desirable noise attenuation properties.

THE DRAWING

A vibration damper constructed in accordance with the preferred embodiment of the invention is illustrated in the accompanying drawings, wherein:

FIG. 1 is a view, partly in section and partly in elevation, of a damper partially inserted in a hollow propeller shaft;

FIG. 2 is a fragmentary elevational view illustrating the damper in a preliminary stage of its manufacture;

FIG. 3 is an enlarged sectional view taken on the line 3—3 of FIG. 2;

FIG. 4 is a view similar to FIG. 2, but illustrating the damper at a further stage of its manufacture;

FIG. 5 is an enlarged sectional view taken on the line 5—5 of FIG. 4;

FIG. 6 is an enlarged sectional view of the completed damper and taken on the line 6—6 of FIG. 1; and FIG. 7 is a fragmentary elevational view taken on the line 7—7 of FIG. 1.

DETAILED DESCRIPTION

A vibration damper constructed in accordance with the preferred embodiment of the invention comprises a tubular liner designated generally by the reference character 1 and is adapted for use in conjunction with a tubular propeller or drive shaft 2 formed from steel, aluminum, synthetic, or other suitable material and which forms part of the drive train between a vehicle's engaging and its driven wheels. The shaft has a bore 3.

The liner 1 comprises a cylindrical base tube or core 4 formed of a suitable number of plies of helically wound paperboard or other fibrous material. The outer surface of the core 4 carries a coating of adhesive to which is secured an intermediate winding 5 of paperboard having a helical gap 6 therein. Occupying the gap 6 and extending the full length of the core is an elongate, helical retaining member 7 formed of an elastic, deformable, rubbery material, such as etheylene propylene diene monomer, having frictional properties much greater than those of the material from which the drive shaft is formed.

The retaining member 7 has a flat base 8 having on one side thereof an enlarged center section 9 flanked by a pair of flanges 10. The base has a transverse dimension corresponding substantially to that of the gap 6 and is secured to the outer surface of the core 4 within the gap 6 by means of a suitable adhesive which will bond the material of the base to that of the core.

The center section of the retaining member 7 has three outwardly projecting, spaced apart ribs 11, 12, and 13. The ribs 11 and 12 are of substantially uniform height, whereas the central rib 13 extends somewhat beyond the outboard ribs 11 and 12.

When applying the retaining strip 7 to the core 4 the retaining member preferably is maintained under uniform tension as to ensure that the strip as applied is of relatively uniform width and height. The tension applied to the strip may be sufficient to effect elongation of up to about 10% of its untensioned length.

The adhesive by means of which the retaining strip 7 is secured to the core is applied to the flat base 8 of the strip and should be one that is relatively impervious to moisture and capable of bonding the strip securely to the core. An isocyanoacrylate adhesive is satisfactory.

Following application of the retaining strip to the core 4, a winding 14 of corrugated or other paper is applied and adhesively secured to the winding 5. The winding 14 overlaps the marginal flanges 10 of the strip 7. In the application of the corrugated winding 14 the outboard ribs 11 and 12 function to guide the marginal edges of the winding. The overlapping of the flanges 10 by the winding 14 serves to reinforce the adherence of the strip to the core 4.

A typical liner has a length of between about 8 and 16 inches. The outside diameter of the corrugated winding 14 corresponds substantially to the diameter of the bore 3 of the shaft 2. The ribs 11 and 12 preferably are flush with the outer surface of the corrugated winding 14, whereas the rib 13 preferably projects about 0.03 inch beyond the outer surface of the winding 14 so as to have an interference fit with the propeller shaft 2. These dimensional relationships enable the liner to be press fitted within and located at a desired position longitudinally of the bore of the propeller shaft under an application force of not more than about 200 pounds, yet the forceful and frictional engagement between the retaining strip 7 and the surface of the bore 3 ensures retention of the damper at the desired location longitudinally of the shaft.

The disclosed embodiment is representative of a presently preferred form of the invention, but is intended to be illustrative rather than definitive thereof. The invention is defined in the claims.

What is claimed is:

1. A liner for a hollow, cylindrical member having a bore of predetermined diameter, said liner comprising a tube having an outer diameter of such dimension as to be accommodated within said bore; and at least one retaining member carried by said tube and projecting beyond its outer surface a distance sufficient to bear against the surface of said bore when said tube is within said cylindrical member, said retaining member having a base secured at one side thereof to said tube and at least one upstanding rib carried by said base at its opposite side, said retaining member being formed of a deformable material having frictional properties greater than those of the material at the outer surface of said tube.

2. The liner according to claim 1 wherein said tube is formed of paper.

3. The liner according to claim 1 wherein said retaining member is formed of a rubber material.

4. The liner according to claim 1 wherein said retaining member extends substantially the full length of said tube.

5. The liner according to claim wherein said retaining member is helically wound on said tube.

6. The liner according to claim 1 wherein a plurality of upstanding, spaced apart ribs are carried by said base at its opposite side.

7. The liner according to claim 6 wherein said ribs are of different height.

8. The liner according to claim 1 wherein said tube comprises a wound core of paper.

9. The liner according to claim 1 wherein said retaining member is adhesively secured to said tube.

10. The liner according to claim 1 wherein said rib is positioned on said base between opposite edges of said base, and means carried by said tube and overlying the opposite edges of said base adjacent said rib.

11. The liner according to claim 10 wherein said one side of said base is adhesively secured to said tube.

12. The liner according to claim 10 wherein the means overlying said base is adhesively secured thereto.

13. A liner for a hollow, cylindrical member having a bore of predetermined diameter, said liner comprising a tube having an outer diameter of such dimension as to be accommodated in said bore; a retaining member helically wound on said tube and projecting outwardly beyond its outer surface a distance sufficient to bear against the surface of said bore when said tube is within said cylindrical member, said retaining member being formed of material having frictional properties greater than those of the material at the outer surface of said tube; and means securing said retaining member to said tube.

14. The liner according to claim 13 wherein said securing means comprises an adhesive.

15. The liner according to claim 13 wherein said retaining member has a base one surface of which seats on said tube and the opposite surface of which includes a projecting rib of less width than that of said base, thereby forming flanges flanking said rib.

16. The liner according to claim 15 wherein said securing means comprises a helical strip of material overlying said flanges.

17. The liner according to claim 13 wherein said retaining member is elastic and is wound on said tube under sufficient tension to elongate said retaining member.

18. The liner according to claim 17 wherein said retaining member is elongated up to 10% of its untensioned length.

19. The liner according to claim 17 wherein the material forming said retaining member is rubbery and the material at the outer surface of said tube is paper.

20. A liner for a hollow, cylindrical member having a bore of predetermined diameter, said liner comprising a tube having an outer diameter of such dimension as to be accommodated within said bore; and at least one retaining member secured to said tube and projecting beyond its outer surface a distance sufficient to bear against the surface of said bore when said tube is within said cylindrical member, said retaining member extending substantially the full length of said tube and being formed of a deformable material having frictional properties greater than those of the material at the outer surface of said tube.

* * * * *

UNITED STATES PATENT AND TRADEMARK OFFICE
CERTIFICATE OF CORRECTION

PATENT NO. : 4,909,361
DATED : March 20, 1990
INVENTOR(S) : Stark et al

It is certified that error appears in the above-identified patent and that said Letters Patent is hereby corrected as shown below:

In column 2, line 20, change "engaging" to -- engine --;

In column 3, line 35, change "rubber" to -- rubbery --;

In column 3, line 39, after "claim" insert -- 1 --.

Signed and Sealed this

Second Day of April, 1991

Attest:

HARRY F. MANBECK, JR.

*Attesting Officer*    *Commissioner of Patents and Trademarks*